(12) United States Patent
Zalewski

(10) Patent No.: US 8,368,753 B2
(45) Date of Patent: Feb. 5, 2013

(54) CONTROLLER WITH AN INTEGRATED DEPTH CAMERA

(75) Inventor: Gary Zalewski, Oakland, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 1301 days.

(21) Appl. No.: 12/050,128

(22) Filed: Mar. 17, 2008

(65) Prior Publication Data

US 2009/0231425 A1 Sep. 17, 2009

(51) Int. Cl.
*H04N 7/18* (2006.01)
*G06T 15/00* (2006.01)

(52) U.S. Cl. .......... 348/142; 348/42; 345/419; 345/520; 463/32

(58) Field of Classification Search .............. 463/32, 463/37, 33, 39, 31; 715/706; 348/142, 42; 345/419, 520
See application file for complete search history.

(56) References Cited

U.S. PATENT DOCUMENTS

| | | | |
|---|---|---|---|
| 3,943,277 A | 3/1976 | Everly et al. | 348/169 |
| 4,263,504 A | 4/1981 | Thomas | 235/454 |
| 4,313,227 A | 1/1982 | Eder | 398/106 |
| 4,558,864 A | 12/1985 | Medwedeff | 273/148 B |
| 4,565,999 A | 1/1986 | King et al. | 345/158 |
| 4,802,227 A | 1/1989 | Elko et al. | 381/92 |
| 4,823,001 A | 4/1989 | Kobayashi et al. | 356/616 |
| 4,843,568 A | 6/1989 | Krueger et al. | 382/100 |
| 5,034,986 A | 7/1991 | Karmann et al. | 382/103 |
| 5,055,840 A | 10/1991 | Bartlett | 341/31 |
| 5,111,401 A | 5/1992 | Everett et al. | 701/24 |
| 5,144,594 A | 9/1992 | Gilchrist | 367/129 |
| 5,260,556 A | 11/1993 | Lake et al. | 235/494 |
| 5,297,061 A | 3/1994 | Dementhon et al. | 345/180 |

(Continued)

FOREIGN PATENT DOCUMENTS

| | | |
|---|---|---|
| EP | 0353200 | 1/1990 |
| EP | 0652686 | 5/1995 |

(Continued)

OTHER PUBLICATIONS

Kahlmann et al, "Calibration for Increased Accuracy of the Range Imaging Camera Swissranger", ISPRS Commission V Symposium 'Image Engineering and Vision Metrology', Sep. 2006 pp. 136-141.

(Continued)

*Primary Examiner* — Jungwon Chang
(74) *Attorney, Agent, or Firm* — Martine Penilla Group, LLP

(57) ABSTRACT

A method for determining a position of a controller in a three-dimensional space is disclosed. The method includes an operation to calibrate a computer program to identify a group of recognized fixed points from a plurality of fixed points within the three-dimensional space using a depth camera integrated with the controller. Another operation activates use of the controller and depth camera during interface with the application. During use of the controller, image and depth data within the three-dimensional space is captured with the depth camera of the controller. In another operation the image and depth data is analyzed to find one or more of the group of recognized fixed points. In one embodiment, the previous two operations are repeated and changes of position of the controller are determined based on a change in position of the found ones of the group of recognized fixed points. The method also includes an operation to trigger an input command based on the determined change in position of the controller, wherein the input command causes an action by the application.

4 Claims, 9 Drawing Sheets

U.S. PATENT DOCUMENTS

| | | | | |
|---|---|---|---|---|
| 5,335,011 A | 8/1994 | Addeo et al. | ................ | 348/15 |
| 5,394,168 A | 2/1995 | Smith, III et al. | ............ | 345/156 |
| 5,426,450 A | 6/1995 | Drumm | ........................ | 345/168 |
| 5,440,356 A | 8/1995 | Fukuwa | ........................ | 345/156 |
| 5,455,685 A | 10/1995 | Mori | ............................ | 348/363 |
| 5,473,701 A | 12/1995 | Cezanne et al. | ................ | 381/92 |
| 5,485,273 A | 1/1996 | Mark et al. | ................... | 356/350 |
| 5,534,917 A | 7/1996 | MacDougall | ................ | 348/169 |
| 5,543,818 A | 8/1996 | Scott | ............................ | 345/168 |
| 5,557,684 A | 9/1996 | Wang et al. | ................... | 382/107 |
| 5,563,988 A | 10/1996 | Maes et al. | ................... | 345/421 |
| 5,568,928 A | 10/1996 | Munson et al. | ................ | 463/37 |
| 5,581,276 A | 12/1996 | Cipolla et al. | ................ | 345/156 |
| 5,583,478 A | 12/1996 | Renzi | ........................ | 340/407.1 |
| 5,586,231 A | 12/1996 | Florent et al. | ................ | 345/472 |
| 5,611,731 A | 3/1997 | Bouton et al. | ................ | 463/37 |
| 5,616,078 A | 4/1997 | Oh | ................................ | 463/8 |
| 5,638,228 A | 6/1997 | Thomas, III | ................... | 360/60 |
| 5,649,021 A | 7/1997 | Matey et al. | ................... | 382/128 |
| 5,675,825 A | 10/1997 | Dreyer et al. | ................ | 395/800 |
| 5,675,828 A | 10/1997 | Stoel et al. | ................... | 395/825 |
| 5,677,710 A | 10/1997 | Thompson-Rohrlich | ...... | 345/173 |
| 5,706,364 A | 1/1998 | Kopec et al. | ................... | 382/159 |
| 5,768,415 A | 6/1998 | Jagadish et al. | ............... | 382/154 |
| 5,796,354 A | 8/1998 | Cartabiano et al. | ............ | 341/22 |
| 5,818,424 A | 10/1998 | Korth | ............................ | 345/158 |
| 5,846,086 A | 12/1998 | Bizzi et al. | ................... | 434/247 |
| 5,850,222 A | 12/1998 | Cone | ............................ | 345/418 |
| 5,850,473 A | 12/1998 | Andersson | ................... | 382/165 |
| 5,861,910 A | 1/1999 | McGarry et al. | ................ | 348/87 |
| 5,870,100 A | 2/1999 | DeFreitas | ................... | 345/441 |
| 5,883,616 A | 3/1999 | Koizumi et al. | ................ | 345/156 |
| 5,889,672 A | 3/1999 | Schuler et al. | ................ | 700/83 |
| 5,900,863 A | 5/1999 | Numazaki | ................... | 345/158 |
| 5,913,727 A | 6/1999 | Ahdoot | ........................ | 463/39 |
| 5,914,723 A | 6/1999 | Gajewska | ................... | 345/597 |
| 5,917,493 A | 6/1999 | Tan et al. | ................... | 715/835 |
| 5,923,306 A | 7/1999 | Smith et al. | ................... | 345/2 |
| 5,923,318 A | 7/1999 | Zhai et al. | ................... | 345/157 |
| 5,929,444 A | 7/1999 | Leichner | .................... | 250/341.7 |
| 5,930,383 A | 7/1999 | Netaer | ........................ | 382/154 |
| 5,930,741 A | 7/1999 | Kramer | ........................ | 702/153 |
| 5,937,081 A | 8/1999 | O'Brill et al. | ................ | 382/111 |
| 5,959,596 A | 9/1999 | McCarten et al. | ................ | 345/2 |
| 5,963,250 A | 10/1999 | Parker et al. | ................ | 348/211.6 |
| 5,993,314 A | 11/1999 | Dannenberg et al. | ............ | 461/1 |
| 6,009,210 A | 12/1999 | Kang | ............................ | 382/276 |
| 6,021,219 A | 2/2000 | Andersson et al. | ........... | 382/190 |
| 6,031,545 A | 2/2000 | Ellenby et al. | ................ | 345/435 |
| 6,031,934 A | 2/2000 | Ahmad et al. | ................ | 382/154 |
| 6,037,942 A | 3/2000 | Millington | ................... | 715/835 |
| 6,044,181 A | 3/2000 | Szeliski et al. | ............... | 382/284 |
| 6,049,619 A | 4/2000 | Anandan et al. | ................ | 382/107 |
| 6,056,640 A | 5/2000 | Schaaij | ............................ | 463/4 |
| 6,057,909 A | 5/2000 | Yahav et al. | ................ | 356/5.04 |
| 6,061,055 A | 5/2000 | Marks | ........................ | 382/276 |
| 6,075,895 A | 6/2000 | Qiao et al. | ................... | 382/218 |
| 6,078,789 A | 6/2000 | Bodenmann et al. | ............ | 455/66 |
| 6,091,905 A | 7/2000 | Yahav et al. | ................ | 396/106 |
| 6,094,625 A | 7/2000 | Ralston | ........................ | 702/150 |
| 6,097,369 A | 8/2000 | Wambach | ................... | 345/158 |
| 6,100,517 A | 8/2000 | Yahav et al. | ................ | 250/208.1 |
| 6,100,895 A | 8/2000 | Miura et al. | ................... | 345/426 |
| 6,101,289 A | 8/2000 | Kellner | ........................ | 382/276 |
| 6,115,052 A | 9/2000 | Freeman et al. | ................ | 345/473 |
| 6,134,346 A | 10/2000 | Berman et al. | ................ | 382/163 |
| 6,144,367 A | 11/2000 | Berstis | ........................ | 345/158 |
| 6,151,009 A | 11/2000 | Kanade et al. | ................ | 345/641 |
| 6,160,540 A | 12/2000 | Fishkin et al. | ................ | 345/184 |
| 6,166,744 A | 12/2000 | Jaszlics et al. | ............... | 345/435 |
| 6,173,059 B1 | 1/2001 | Huang et al. | ................... | 381/92 |
| 6,175,343 B1 | 1/2001 | Mitchell et al. | ............... | 345/8 |
| 6,184,863 B1 | 2/2001 | Sibert et al. | ................ | 345/156 |
| 6,191,773 B1 | 2/2001 | Maruno et al. | ................ | 345/158 |
| 6,195,104 B1 | 2/2001 | Lyons | ........................ | 345/473 |
| 6,215,898 B1 | 4/2001 | Woodfill et al. | ............... | 382/154 |
| 6,243,491 B1 | 6/2001 | Andersson | ................... | 382/165 |
| 6,275,213 B1 | 8/2001 | Tremblay et al. | ................ | 345/156 |
| 6,281,930 B1 | 8/2001 | Parker et al. | ................ | 348/211.9 |
| 6,282,362 B1 | 8/2001 | Murphy et al. | ................ | 386/46 |
| 6,295,064 B1 | 9/2001 | Yamaguchi | ................... | 345/419 |
| 6,297,838 B1 | 10/2001 | Chang et al. | ................ | 715/863 |
| 6,304,267 B1 | 10/2001 | Sata | ............................ | 345/427 |
| 6,307,549 B1 | 10/2001 | King et al. | ................ | 715/810 |
| 6,307,568 B1 | 10/2001 | Rom | ........................ | 345/629 |
| 6,323,839 B1 | 11/2001 | Fukuda et al. | ................ | 345/157 |
| 6,323,942 B1 | 11/2001 | Bamji | ........................ | 356/5.01 |
| 6,326,901 B1 | 12/2001 | Gonzales | ................... | 340/7.2 |
| 6,327,073 B1 | 12/2001 | Yahav et al. | ................ | 359/321 |
| 6,331,911 B1 | 12/2001 | Manassen et al. | ................ | 359/260 |
| 6,346,929 B1 | 2/2002 | Fukushima et al. | ............ | 354/8 |
| 6,351,661 B1 | 2/2002 | Cosman | ........................ | 600/426 |
| 6,371,849 B1 | 4/2002 | Togami | ........................ | 463/4 |
| 6,392,644 B1 | 5/2002 | Miyata et al. | ................ | 345/419 |
| 6,394,897 B1 | 5/2002 | Togami | ........................ | 463/4 |
| 6,400,374 B2 | 6/2002 | Lanier | ........................ | 345/630 |
| 6,409,602 B1 | 6/2002 | Wiltshire et al. | ............... | 463/42 |
| 6,411,392 B1 | 6/2002 | Bender et al. | ................ | 358/1.14 |
| 6,411,744 B1 | 6/2002 | Edwards | ........................ | 382/294 |
| 6,417,836 B1 | 7/2002 | Kumar et al. | ................ | 345/156 |
| 6,441,825 B1 | 8/2002 | Peters | ........................ | 345/473 |
| 6,473,516 B1 | 10/2002 | Kawaguchi et al. | ............ | 382/100 |
| 6,498,860 B1 | 12/2002 | Sasaki et al. | ................ | 382/103 |
| 6,504,535 B1 | 1/2003 | Edmark | ........................ | 345/419 |
| 6,516,466 B1 | 2/2003 | Jackson | ........................ | 725/62 |
| 6,533,420 B1 | 3/2003 | Eichenlaub | ................... | 353/7 |
| 6,542,927 B2 | 4/2003 | Rhoads | ........................ | 709/217 |
| 6,545,706 B1 | 4/2003 | Edwards et al. | ................ | 348/169 |
| 6,546,153 B1 | 4/2003 | Hoydal | ........................ | 382/285 |
| 6,556,704 B1 | 4/2003 | Chen | ............................ | 382/154 |
| 6,577,748 B2 | 6/2003 | Chang | ............................ | 382/100 |
| 6,580,414 B1 | 6/2003 | Wergen et al. | ................ | 345/156 |
| 6,580,415 B1 | 6/2003 | Kato et al. | ................ | 345/156 |
| 6,587,573 B1 | 7/2003 | Stam et al. | ................ | 382/104 |
| 6,593,956 B1 | 7/2003 | Potts et al. | ................... | 348/14.09 |
| 6,621,938 B1 | 9/2003 | Tanaka et al. | ................ | 382/276 |
| 6,628,265 B2 | 9/2003 | Hwang | ............................ | 345/156 |
| 6,661,914 B2 | 12/2003 | Dufour | ........................ | 382/154 |
| 6,674,415 B2 | 1/2004 | Nakamura et al. | ............ | 345/32 |
| 6,676,522 B2 | 1/2004 | Rowe et al. | ................ | 463/42 |
| 6,677,967 B2 | 1/2004 | Sawano et al. | ................ | 715/839 |
| 6,677,987 B1 | 1/2004 | Girod | ............................ | 348/171 |
| 6,709,108 B2 | 3/2004 | Levine et al. | ................ | 351/211 |
| 6,720,949 B1 | 4/2004 | Pryor et al. | ................ | 345/158 |
| 6,727,988 B2 | 4/2004 | Kim et al. | ................... | 356/319 |
| 6,741,741 B2 | 5/2004 | Farrell | ........................ | 382/199 |
| 6,746,124 B2 | 6/2004 | Fischer et al. | ................ | 353/43 |
| 6,751,338 B1 | 6/2004 | Wallack | ........................ | 382/106 |
| 6,753,849 B1 | 6/2004 | Curran et al. | ................ | 345/158 |
| 6,767,282 B2 | 7/2004 | Matsuyama et al. | ............ | 463/3 |
| 6,769,769 B2 | 8/2004 | Podlleanu et al. | ............... | 351/221 |
| 6,772,057 B2 | 8/2004 | Breed et al. | ................ | 701/45 |
| 6,774,939 B1 | 8/2004 | Peng | ............................ | 348/231.4 |
| 6,785,329 B1 | 8/2004 | Pan et al. | ................ | 375/240.08 |
| 6,789,967 B1 | 9/2004 | Forester | ........................ | 400/489 |
| 6,791,531 B1 | 9/2004 | Johnston et al. | ............... | 345/157 |
| 6,795,068 B1 | 9/2004 | Marks | ........................ | 345/419 |
| 6,809,776 B1 | 10/2004 | Simpson et al. | ................ | 348/565 |
| 6,819,318 B1 | 11/2004 | Geng | ............................ | 345/420 |
| 6,847,311 B2 | 1/2005 | Li | ................................ | 341/28 |
| 6,863,609 B2 | 3/2005 | Okuda et al. | ................ | 463/36 |
| 6,881,147 B2 | 4/2005 | Naghi et al. | ................ | 463/35 |
| 6,884,171 B2 | 4/2005 | Eck et al. | ................... | 463/42 |
| 6,890,262 B2 | 5/2005 | Oishi et al. | ................ | 463/31 |
| 6,917,688 B2 | 7/2005 | Yu et al. | ................ | 381/94.7 |
| 6,919,824 B2 | 7/2005 | Lee | ............................ | 341/20 |
| 6,924,787 B2 | 8/2005 | Kramer et al. | ................ | 345/156 |
| 6,928,180 B2 | 8/2005 | Stam et al. | ................ | 382/104 |
| 6,930,725 B1 | 8/2005 | Hayashi | ........................ | 348/373 |
| 6,931,596 B2 | 8/2005 | Gutta et al. | ................ | 715/728 |
| 6,943,776 B2 | 9/2005 | Ehrenburg | ................... | 345/168 |
| 6,945,653 B2 | 9/2005 | Kobori et al. | ................ | 353/30 |
| 6,951,515 B2 | 10/2005 | Ohshima et al. | ................ | 463/31 |
| 6,952,198 B2 | 10/2005 | Hansen | ........................ | 345/158 |
| 6,965,362 B1 | 11/2005 | Ishizuka | ........................ | 345/82 |
| 6,970,183 B1 | 11/2005 | Monroe | ........................ | 348/143 |
| 6,990,639 B2 | 1/2006 | Wilson | ........................ | 715/863 |

| | | | | | | |
|---|---|---|---|---|---|---|
| 7,006,009 | B2 | 2/2006 | Newman .................... 340/854.5 | 2004/0180720 A1 | 9/2004 | Nashi et al. |
| 7,016,411 | B2 | 3/2006 | Azuma et al. ........... 375/240.08 | 2004/0213419 A1 | 10/2004 | Varma et al. .................... 381/92 |
| 7,039,199 | B2 | 5/2006 | Rui ............................... 381/92 | 2004/0227725 A1 | 11/2004 | Calarco et al. ................ 345/156 |
| 7,039,253 | B2 | 5/2006 | Matsuoka et al. ........... 382/295 | 2004/0254017 A1 | 12/2004 | Cheng .............................. 463/35 |
| 7,042,440 | B2 | 5/2006 | Pryor et al. .................. 345/158 | 2005/0037844 A1 | 2/2005 | Shum et al. ..................... 463/36 |
| 7,043,056 | B2 | 5/2006 | Edwards et al. ............. 382/103 | 2005/0047611 A1 | 3/2005 | Mao ........................... 381/94.7 |
| 7,054,452 | B2 | 5/2006 | Ukita ............................ 381/92 | 2005/0088369 A1 | 4/2005 | Yoshioka ........................ 345/60 |
| 7,059,962 | B2 | 6/2006 | Watashiba ....................... 463/2 | 2005/0102374 A1 | 5/2005 | Moragne et al. ............. 709/217 |
| 7,061,507 | B1 | 6/2006 | Tuomi et al. ................. 345/611 | 2005/0105777 A1 | 5/2005 | Kozlowski et al. ........... 382/115 |
| 7,071,914 | B1 | 7/2006 | Marks .......................... 345/156 | 2005/0117045 A1 | 6/2005 | Abdellatif et al. ............ 384/335 |
| 7,090,352 | B2 | 8/2006 | Kobor et al. .................. 353/30 | 2005/0198095 A1 | 9/2005 | Du et al. ....................... 709/200 |
| 7,098,891 | B1 | 8/2006 | Pryor ........................... 345/158 | 2005/0226431 A1 | 10/2005 | Mao ................................ 381/61 |
| 7,102,615 | B2 | 9/2006 | Marks .......................... 345/156 | 2005/0239548 A1 | 10/2005 | Ueshima et al. ................ 463/36 |
| 7,106,366 | B2 | 9/2006 | Parker et al. ............... 348/222.1 | 2006/0033713 A1 | 2/2006 | Pryor ........................... 345/158 |
| 7,116,330 | B2 | 10/2006 | Marshall et al. ............. 345/474 | 2006/0035710 A1 | 2/2006 | Festejo et al. ................... 463/36 |
| 7,116,342 | B2 | 10/2006 | Dengler et al. .............. 345/630 | 2006/0038819 A1 | 2/2006 | Festejo et al. ................. 345/530 |
| 7,121,946 | B2 | 10/2006 | Paul et al. ...................... 463/36 | 2006/0204012 A1 | 9/2006 | Marks et al. .................... 381/26 |
| 7,139,767 | B1 | 11/2006 | Taylor et al. ................. 707/102 | 2006/0233389 A1 | 10/2006 | Mao et al. ...................... 381/92 |
| 7,148,922 | B2 | 12/2006 | Shimada ...................... 348/370 | 2006/0252541 A1 | 11/2006 | Zalewski et al. .............. 463/156 |
| 7,164,413 | B2 | 1/2007 | Davis et al. .................. 345/163 | 2006/0256081 A1 | 11/2006 | Zalewski et al. .............. 345/156 |
| 7,183,929 | B1 | 2/2007 | Antebi et al. .............. 340/573.1 | 2006/0264258 A1 | 11/2006 | Zalewski et al. ................ 463/36 |
| 7,212,308 | B2 | 5/2007 | Morgan ....................... 358/1.18 | 2006/0264259 A1 | 11/2006 | Zalewski et al. ................ 463/36 |
| 7,223,173 | B2 | 5/2007 | Masuyama et al. ........... 463/36 | 2006/0264260 A1 | 11/2006 | Zalewski et al. ................ 463/36 |
| 7,224,384 | B1 | 5/2007 | Iddan et al. .............. 348/207.99 | 2006/0269072 A1 | 11/2006 | Mao ................................ 381/56 |
| 7,227,526 | B2 | 6/2007 | Hildreth et al. .............. 345/156 | 2006/0269073 A1 | 11/2006 | Mao ................................ 381/56 |
| 7,227,976 | B1 | 6/2007 | Jung et al. .................... 382/103 | 2006/0274032 A1 | 12/2006 | Mao et al. ..................... 345/156 |
| 7,245,273 | B2 | 7/2007 | Eberl et al. ................... 351/211 | 2006/0274911 A1 | 12/2006 | Mao et al. ..................... 381/334 |
| 7,259,375 | B2 | 8/2007 | Tichit et al. ................ 250/341.8 | 2006/0277571 A1 | 12/2006 | Marks et al. |
| 7,263,462 | B2 | 8/2007 | Funge et al. ................. 702/179 | 2006/0280312 A1 | 12/2006 | Mao ................................ 381/56 |
| 7,274,305 | B1 | 9/2007 | Luttrell .................... 340/870.02 | 2006/0282873 A1 | 12/2006 | Zalewski et al. .............. 725/133 |
| 7,283,679 | B2 | 10/2007 | Okada et al. ................ 382/260 | 2006/0287084 A1 | 12/2006 | Mao et al. ....................... 463/37 |
| 7,296,007 | B1 | 11/2007 | Funge et al. ................... 706/47 | 2006/0287085 A1 | 12/2006 | Mao et al. ....................... 463/37 |
| 7,301,530 | B2 | 11/2007 | Lee et al. ..................... 345/158 | 2006/0287086 A1 | 12/2006 | Zalewski et al. .............. 436/37 |
| 7,305,114 | B2 | 12/2007 | Wolff et al. .................. 709/200 | 2006/0287087 A1 | 12/2006 | Zalewski et al. ................ 463/37 |
| 7,346,387 | B1 | 3/2008 | Wachter et al. .............. 600/476 | 2007/0015559 A1 | 1/2007 | Zalewski et al. ................. 463/1 |
| 7,352,359 | B2 | 4/2008 | Zalewski et al. ............ 345/156 | 2007/0021208 A1 | 1/2007 | Mao et al. ....................... 463/36 |
| 7,364,297 | B2 | 4/2008 | Goldfain et al. ............. 351/206 | 2007/0025562 A1 | 2/2007 | Zalewski et al. ................ 381/92 |
| 7,379,559 | B2 | 5/2008 | Wallace et al. .............. 382/100 | 2007/0060336 A1 | 3/2007 | Marks et al. .................... 463/30 |
| 7,391,409 | B2 | 6/2008 | Zalewski et al. ............ 345/156 | 2007/0061413 A1 | 3/2007 | Larsen et al. ................. 709/217 |
| 7,436,887 | B2 | 10/2008 | Yeredor et al. .............. 375/240 | 2007/0066394 A1 | 3/2007 | Ikeda et al. ..................... 463/37 |
| 7,446,650 | B2 | 11/2008 | Scholfield et al. ......... 340/425.5 | 2007/0072675 A1 | 3/2007 | Hammano et al. ............. 463/42 |
| 7,545,926 | B2 | 6/2009 | Mao ........................ 379/406.08 | 2007/0120834 A1 | 5/2007 | Boillot ......................... 354/103 |
| 7,558,698 | B2 | 7/2009 | Funge et al. ................. 702/179 | 2007/0120996 A1 | 5/2007 | Boillot ......................... 384/345 |
| 7,585,225 | B2 * | 9/2009 | Minagawa ..................... 463/33 | 2007/0260340 A1 | 11/2007 | Mao ............................... 700/94 |
| 7,613,610 | B1 | 11/2009 | Zimmerman et al. ........ 704/235 | 2007/0260517 A1 | 11/2007 | Zalewski et al. .............. 705/14 |
| 7,623,115 | B2 | 11/2009 | Marks .......................... 345/156 | 2007/0261077 A1 | 11/2007 | Zalewski et al. ................ 725/35 |
| 7,627,139 | B2 | 12/2009 | Marks et al. ................. 382/103 | 2007/0265088 A1 * | 11/2007 | Nakada et al. .................. 463/37 |
| 7,636,645 | B1 | 12/2009 | Yen et al. ..................... 702/152 | 2007/0270215 A1 * | 11/2007 | Miyamoto et al. ............. 463/32 |
| 7,636,697 | B1 | 12/2009 | Dobson et al. ................. 706/12 | 2008/0001951 A1 | 1/2008 | Marks et al. |
| 7,636,701 | B2 | 12/2009 | Funge et al. ................... 706/47 | 2008/0056561 A1 | 3/2008 | Sawachi ....................... 382/154 |
| 7,697,700 | B2 | 4/2010 | Mao ........................... 381/94.3 | 2008/0070684 A1 * | 3/2008 | Haigh-Hutchinson ......... 463/32 |
| 7,721,231 | B2 | 5/2010 | Wilson ........................ 715/863 | 2008/0091421 A1 * | 4/2008 | Gustavsson ................... 704/233 |
| 2001/0056477 | A1 | 12/2001 | McTernan et al. ........... 709/219 | 2008/0215974 A1 * | 9/2008 | Harrison et al. .............. 715/706 |
| 2002/0010655 | A1 | 1/2002 | Kjallstrom ..................... 705/27 | 2008/0318679 A1 * | 12/2008 | Tran et al. ....................... 463/39 |
| 2002/0056114 | A1 | 5/2002 | Fillebrown et al. ............ 725/78 | 2009/0010494 A1 | 1/2009 | Bechtel et al. ................ 382/104 |
| 2002/0072414 | A1 | 6/2002 | Stylinski et al. ............... 463/42 | 2009/0016642 A1 | 1/2009 | Hart .............................. 382/278 |
| 2002/0075286 | A1 | 6/2002 | Yonezawa et al. ........... 345/679 | 2009/0221368 A1 | 9/2009 | Yen et al. ........................ 463/32 |
| 2002/0083461 | A1 | 6/2002 | Hutcheson et al. ............ 725/62 | 2009/0221374 A1 | 9/2009 | Yen et al. ........................ 463/42 |
| 2002/0085097 | A1 | 7/2002 | Colmenarez et al. ........ 348/211 | 2009/0288064 A1 | 11/2009 | Yen et al. ...................... 717/106 |
| 2002/0094189 | A1 | 7/2002 | Navab et al. ................... 386/4 | 2010/0004896 A1 | 1/2010 | Yen et al. ...................... 702/153 |
| 2002/0126899 | A1 | 9/2002 | Farrell ......................... 382/199 | 2010/0137064 A1 | 6/2010 | Shum et al. ..................... 463/36 |
| 2002/0134151 | A1 | 9/2002 | Naruoka et al. ................ 73/291 | | | |
| 2002/0158873 | A1 | 10/2002 | Williamson .................. 345/427 | FOREIGN PATENT DOCUMENTS | | |
| 2003/0014212 | A1 | 1/2003 | Ralston et al. ............... 702/150 | EP | 0750202 | 12/1996 |
| 2003/0022716 | A1 | 1/2003 | Park et al. ...................... 463/36 | EP | 0835676 | 4/1998 |
| 2003/0093591 | A1 | 5/2003 | Hohl ............................. 710/22 | EP | 1098686 | 5/2003 |
| 2003/0100363 | A1 | 5/2003 | Ali ............................... 436/30 | EP | 1435258 | 7/2004 |
| 2003/0160862 | A1 | 8/2003 | Charlier et al. ............ 348/14.08 | FR | 2814965 | 4/2002 |
| 2003/0232649 | A1 | 12/2003 | Gizis et al. ..................... 463/40 | GB | 2206716 | 1/1989 |
| 2004/0001082 | A1 | 1/2004 | Said ............................. 345/730 | GB | 2206716 | 11/1989 |
| 2004/0017355 | A1 | 1/2004 | Shim ............................ 345/157 | GB | 2376397 | 11/2002 |
| 2004/0063480 | A1 | 4/2004 | Wang ............................. 463/8 | GB | 2388418 | 11/2003 |
| 2004/0063481 | A1 | 4/2004 | Wang ............................. 463/8 | JP | 01-284897 | 11/1989 |
| 2004/0070565 | A1 | 4/2004 | Nayar et al. ................. 345/156 | JP | 06-102980 | 4/1994 |
| 2004/0087366 | A1 | 5/2004 | Shum et al. .................... 463/36 | JP | 07-311568 | 11/1995 |
| 2004/0095327 | A1 | 5/2004 | Lo ............................... 345/169 | JP | 9-128141 | 5/1997 |
| 2004/0140955 | A1 | 7/2004 | Metz ............................ 345/166 | JP | 9-185456 | 7/1997 |
| 2004/0150728 | A1 | 8/2004 | Ogino .......................... 348/239 | JP | 11-38949 | 2/1999 |
| 2004/0178576 | A1 | 9/2004 | Hillis et al. ................... 273/148 | JP | 2000-172431 | 6/2000 |

| | | |
|---|---|---|
| JP | 2000259856 | 9/2000 |
| JP | 2000350859 | 12/2000 |
| JP | 2001-166676 | 6/2001 |
| JP | 2002369969 | 12/2002 |
| JP | 2004-145448 | 5/2004 |
| JP | 2004145448 | 5/2004 |
| JP | 2005-046422 | 2/2005 |
| WO | WO 88/05942 | 8/1988 |
| WO | WO 98/48571 | 10/1998 |
| WO | WO 99/35633 | 7/1999 |
| WO | WO 99/26198 | 10/1999 |
| WO | WO 02/27456 | 2/2002 |
| WO | WO 03/079179 | 9/2003 |
| WO | WO 2005/073838 | 8/2005 |
| WO | WO 2005107911 | 11/2005 |
| WO | WO 2007095082 | 8/2007 |
| WO | WO 2008/056180 | 5/2008 |

OTHER PUBLICATIONS

Ephraim et al. "Speech Enhancement Using a Minimum Mean - Square Error Log—Spectral Amplitude Estimator", 1985, IEEE.

Ephraim et al. "Speech Enhancement Using a Minimum Mean - Square Error Short—Time Spectral Amplitude Estimator", 1984, IEEE.

Richardson et al. "Virtual Network Computing", 1998, IEEE Internet Computing vol. 2.

XP-002453974, "CFS and FS95/98/2000: How to Use the Trim Controls to Keep Your Aircraft Level", Aug. 10, 2007, http://support.microsoft.com/?scid=kb%3Ben-us%3B175195&x=13&y=15.

"The Tracking Cube: A Three-Dimentional Input Device", IBM Technical Disclosure Bulletin, Aug. 1, 1989, pp. 91-95, No. 3B, IBM Corp.New York, U.S.

K. B. Shimoga, et al., "Touch and Force Reflection for Telepresence Surgery", Engineering in Medicine and Biology Opportunities of the IEEEE, Baltimore, MD, USA, Nov. 3, 1994, New York, New York, USA, pp. 1049-1050.

Iddan, et al., "3D Imaging in the Studio (and Elsewhere . . . )", Proceedings of the SPIE, SPIE, Bellingham, VA, US, vol. 4298, Jan. 24, 2001, pp. 48-55, XP008005351.

Jojic, et al., "Tracking Self-Occluding Articulated Objects in Dense Disparity Maps", Computer Vision, 1999, The Proceedings fo the Seventh IEEE International Conference on Kerkyra, Greece Sep. 20-27, 1999, Los Alamitos, CA, US, IEEE Computer Society, US, Sep. 20, 1999, pp. 123-130.

Klinker, et al., "Distributed User Tracking Concepts for Augmented Reality Applications", pp. 37-44, Augmented Reality, 2000, IEEE and ACM Int'l Symposium, Oct. 2000, XP010520308, ISBN: 0-7695-0846-4, Germany.

Nakagawa, et al., "A Collision Detection and Motion Image Synthesis Between a Background Image and a Foreground 3-Dimensional Object", TVRSJ Bol. 4, No. 2, pp. 425-430, 1999, Japan.

Mihara, et al., "A Realtime Vision-Based Interface Using Motion Processor and Applications to Robotics", vol. J84-D-11, No. 9, pp. 2070-2078, Sep. 2001, Japan.

Nakamura, et al., "A Consideration on Reconstructing 3-D Model Using Object Views", 2004-01601-003, pp. 17-21, Kokkaido University, Japan, nakamura@media.eng.hokudai.ac.jp.

Nishida, et al., "A Method of Estimating Human Shapes by Fitting the Standard Human Model to Partial Measured Data", D-II vol. J84-D-II, No. 7, pp. 1310-1318, Jul. 2001.

Wilson & Darrell, "Audio-Video Array Source Localization for Intelligent Environments", 2002 IEEE Dept. of Electrical Eng and Computer Science, MIT, Cambridge, MA 02139.

Fiala, et al., "A Panoramic Video and Acoustic Beamforming Sensor for Videoconferencing", 2004 IEEE, Computational Video Group, National Research Council, Ottawa, Canada K1A 0R6.

Hemmi, et al., "3-D Natural Interactive Interface-Using Marker Tracking from a Single View",Sep. 9, 1991, Systems and Computers in Japan.

Lanier, Jaron, "Virtually there: three-dimensional tele-immersion may eventually bring the world to your desk", Scientific American, ISSN: 0036-8733, Year: 2001.

Richardson et al., "Virtual Network Computing" IEEE Internet Computing, vol. 2,No. 1 Jan./Feb. 1998.

Fujitsu, "Internet Development of Emulators" Abstract, Mar. 1997, vol. 48, No. 2.

Kanade, et al., "A Stereo Machine for Video-rate Dense Depth Mapping and Its New Application" 1996, CVPR 96, IEEE Computer Society Conference, pp. 196-202 (022).

Gvili, et al., "Depth Keying", SPIE vol. 5006 (2003), 2003 SPIE-IS &T, pp. 564-574 (031).

* cited by examiner

CONTROLLER WITH AN INTEGRATED DEPTH CAMERA

BACKGROUND OF THE INVENTION

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation, Sony Playstation2 (PS2), and Sony Playstation3 (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet.

While there realism of the gaming experience has steadily improved, users have continued to interact with the gaming platforms through dedicated gaming controllers. While some advances have been made in user interaction additional avenues of user interaction remain that can improve the overall experience of using the gaming console.

It is within this context that embodiments of the invention arise.

SUMMARY

Broadly speaking, the present invention enables users to interact with a computer system using a controller having an associated or integrated depth camera. To calibrate the controller, the depth camera can be used to capture image and depth data within a space. Subsequent image and depth data can be used to determine the relative location of the depth camera, and subsequently, the controller within the space.

In one embodiment, a computer implemented method for determining a position of a controller in a three-dimensional space is disclosed. The method includes an operation to calibrate a computer program to identify a group of recognized fixed points from a plurality of fixed points within the three-dimensional space using a depth camera integrated with the controller. Another operation activates use of the controller and depth camera during interface with the application. During use of the controller, image and depth data within the three-dimensional space is captured with the depth camera of the controller. In another operation the image and depth data is analyzed to find one or more of the group of recognized fixed points. In one embodiment, the previous two operations are repeated and changes of position of the controller are determined based on a change in position of the found ones of the group of recognized fixed points. The method also includes an operation to trigger an input command based on the determined change in position of the controller, wherein the input command causes an action by the application.

In another embodiment, a computer implemented method for interacting with a computer system is disclosed. The method includes an operation that begins an interactive session that is executed on the computer system, and automatically applies a saved controller calibration from a memory. In another operation, the method accepts input to a controller with a mobile depth camera. In one operation, image and depth data within a space is captured with the mobile depth camera. In another operation the image and depth data is analyzed for one or more recognized fixed points. In one embodiment, the previous two operation and repeated and movement of the mobile depth camera within the space is determined based on differences between the recognized fixed points. The method also includes an operation where an input command is triggered based on the movement of the mobile depth camera, wherein the input command causes an action within the interactive session.

In another embodiment, a handheld controller for a computer system is disclosed. The handheld controller includes a controller housing defined by an exterior that encloses and interior volume. The controller also includes interface controls that are partially exposed to the exterior of the housing. Also included with the controller is a depth camera assembly. The depth camera assembly includes a depth module, an image module and processing logic. The depth module and image module are configured to receive image and depth data through a camera lens, and the communication module is configured to transmit and receive data from the processing logic of the depth camera assembly to the computer system. Wherein changes to the image and depth data received by the depth camera assembly trigger input commands for the computer system.

In yet another embodiment, an interactive computing system configured to display an interactive session on a display is disclosed. The computing system includes a computing console with a central processing unit, a graphics processing unit, and a communications interface. The communications interface being configured to provide communication to and from the computing console. The computer system can also include a controller with a depth camera. The depth camera being configured with a depth module, an image module and processing logic. The controller may also include a communication module that is configured to receive and transmit data from the processing logic of the depth camera to the communications interface of the computing console. Wherein changes in image and depth data captured by the depth camera are translated to input commands for the computing system.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

FIGS. 2A-1 and 2A-2 are simplified views showing select components of the mobile depth camera, in accordance with embodiments of the present invention.

DETAILED DESCRIPTION

An invention is disclosed for using image and depth data captured by a mobile depth camera to control an interactive session on a console. Broadly speaking, the console can be any type of system that takes input from a user, whether it is a general-purpose computer (e.g., desktop, notebook, handheld device, smartphone, etc.), or a special purpose computer such as a game console. The mobile depth camera can be mounted to or in a controller for the console and used to capture geometric depth data along image data. The depth camera can provide image and depth data to the console for analysis and processing. In one embodiment, the depth camera is a single lens camera, and in other embodiments, multiple camera lenses can be used to capture images and depth data. The image and depth data captured by the mobile depth camera can be analyzed to determine movement of the controller and depth camera within a space. The movement of the controller can be processed and mapped to control various aspects of the interactive session on the console.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
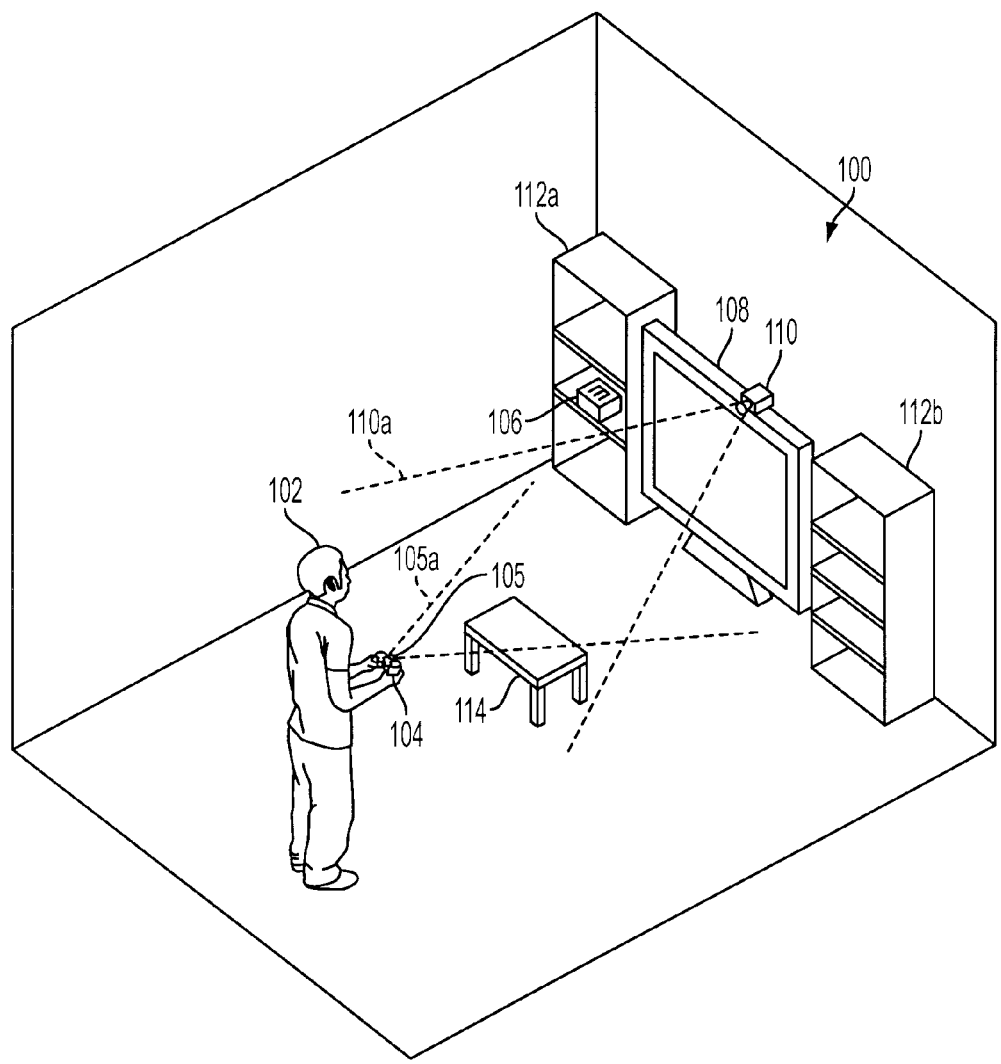
FIG. 1 shows an exemplary space where a console can be used my user, in accordance with one embodiment of the present invention.

FIG. 1 shows an exemplary space 100 where a console 106 is being used by user 102, in accordance with one embodiment of the present invention. The space 100 can include a table 114 along with shelf units 112a/b and a monitor 108. In some embodiments, the monitor 108 is a cathode ray tube (CRT) monitor capable of displaying a variety of video inputs. In other embodiments, the monitor 108 is a flat panel monitor such as a Liquid Crystal Display (LCD) or plasma monitor configured to accept a variety of video inputs (analog or digital).

Connected to the monitor 108 is the console 106 that includes various hardware and firmware that is capable of executing locally or remotely stored software programs. In one embodiment, the software program can be an operating system that outputs video of a Graphical User Interface (GUI) to the monitor 108. The user 102 can interact with the console 108 through the GUI using a controller 104 that includes a mobile depth camera 105. The mobile depth camera 105 captures image and depth data within a field of view 105a. Analysis of the image and depth data captured with the mobile depth camera 105 can be performed to determine the relative position of the controller 104 within the space 100.

The controller 104 can accept a variety of user input such as, but not limited to combinations of digital and/or analog buttons, triggers, joysticks, and touch pads. Additionally, accelerometers within the controller 104 can allow the console 106 to respond to motions imparted by the user 102 to the controller 104. For example, using integrated accelerometers, motions or combinations of motions imparted to the controller such as roll, pitch and yaw can be detected and used to interact with software being executed by the console 106. In some embodiments, wires physically couple and facilitate communications between the console 106 and the controller 104. In other embodiments, the controller 104 can communicate wirelessly to the console 106 using wireless protocols such as, but not limited to Bluetooth and Wi-Fi.

A fixed depth camera 110 can also be coupled to the console 106 and placed so the fixed depth camera 110 has a field of view 110a that includes the table 114, the user 102, and the controller 104. Similar to the mobile depth camera 105, the fixed depth camera can capture image and depth data for objects within the field of view 110a. In one embodiment, the image and depth data from both the fixed depth camera 110 and the mobile depth camera 105 is used to determine the relative position of the controller 104 within the space 100.

Figures 1, 2A:
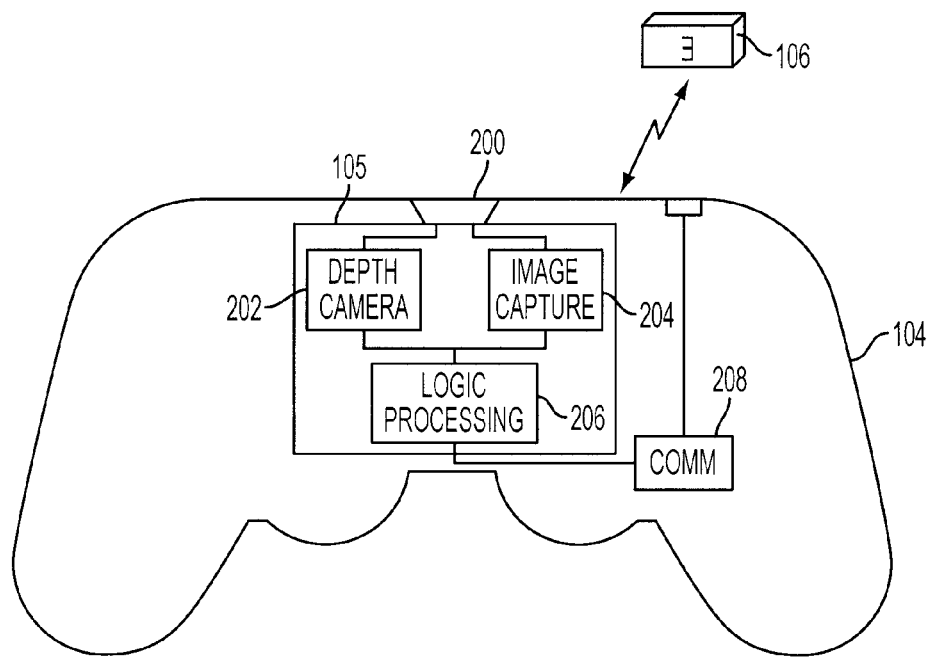
Figures 2, 2A:
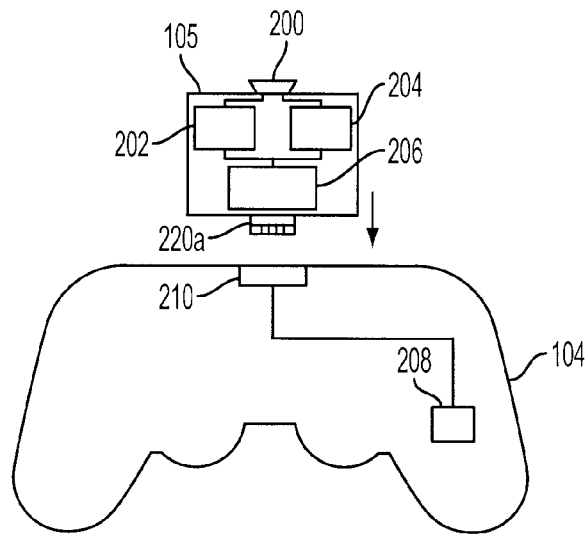

FIGS. 2A-1 and 2A-2 are simplified views showing select components of the mobile depth camera 105, in accordance with embodiments of the present invention. For simplicity, additional components within the controller 104 are not shown. In the embodiment shown in FIG. 2A-1, the mobile depth camera 105 is integrated within the controller 104. In FIG. 2A-2, the mobile depth camera 105 is shown as an external module that can be attached to an exterior port 220b on the controller 104 using a connector 220a (e.g., USB, or other electrical connector). In both embodiments, the mobile depth camera 105 can include a lens 200, a depth module 202 along with an image module 204, and logic processing 206. The depth module 202 can include a variety of sensors, emitters, and logic. In one embodiment, multiple infrared (IR) emitters can be arranged in an array around the lens 200. The IR emitters can be used to send pulses of IR light that reflect off of objects in front of the controller 104. Sensors associated with the IR emitters can measure the time for the reflected IR pulses to return in order to help determine the distance, or depth, of an object from the controller 104.

In some embodiments, logic associated with the depth module 202 can be used to focus the depth module to a particular area within the field of view of the depth camera 105. Focusing the depth module 202 can be accomplished using a variety of techniques. In one embodiment, IR emitters with different wavelengths can be used within an array of IR emitters. Additionally, the different emitters can be pulsed at different times and/or different intensities to focus depth detection in a particular area within the field of view of the depth camera 105.

The image module 204 can be configured to capture image data through the lens 200 using a charged coupled device (CCD) or other type of sensor. In one embodiment, the logic module 206 can input data from both the image module 204 and the depth module 202. The logic module 206 can also receive and interpret commands from the console 106 to change the focus of either the image module 204 or the depth module 202. In wireless embodiments of the controller 104, a communications module 208 can permit bi-direction communications between the controller 104 and the console 106. Thus, signals from the logic module 206 to be transmitted to the console 106 and vice versa. In one embodiment, the communications module 208 can transmit data using a form of the IEEE 802.11 wireless protocols. In another embodiment, a form of the Bluetooth communications standard is used to transmit data from the controller 104 to the console 106.

Figure 2B:
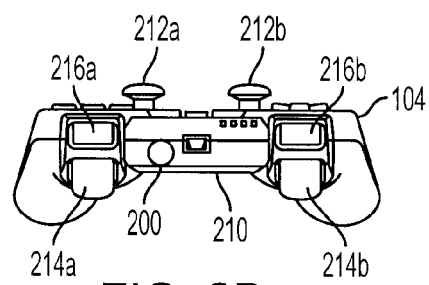
FIG. 2B is an external view of an exemplary controller with an integrated depth camera, in accordance with one embodiment of the present invention.

FIG. 2B is an external view of an exemplary controller 104 with an integrated depth camera 105, in accordance with one embodiment of the present invention. Visible on an exterior of the controller 104 is the lens 200. Also visible on the exterior of the controller 104 is a Universal Serial Bus (USB) port 210, buttons 214a/b and 216a/b, and joysticks 212a/b. The buttons 214a/b and 216a/b along with the joysticks 212a/b can be either analog or digital and allow a user to interface with the console. The controller 104 can be charged when connected to the console via the USB port 210.

Figure 3A:
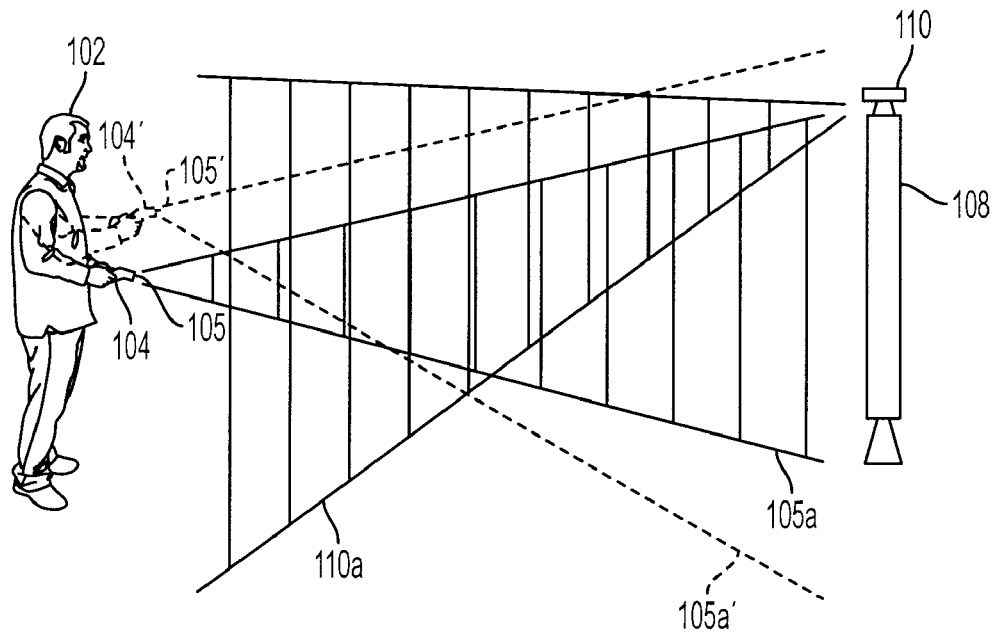
FIGS. 3A and 3B illustrate the user calibrating the controller relative to the camera and the screen, in accordance with various embodiments of the present invention.
Figure 3B:
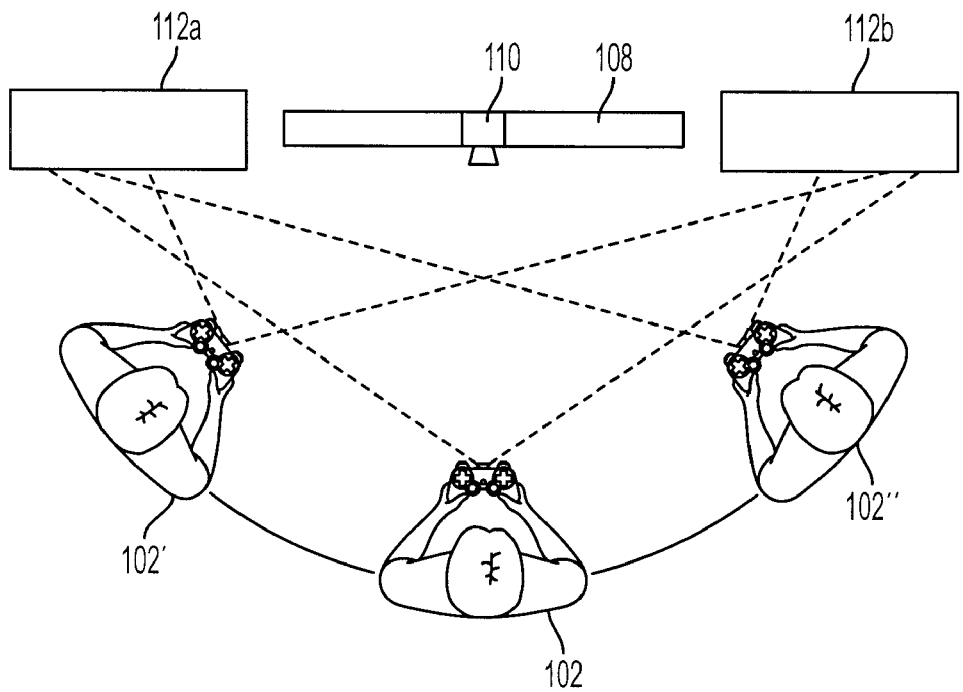

FIGS. 3A and 3B illustrate the user 102 calibrating the controller 104 relative to the camera 110 and the screen 108, in accordance with various embodiments of the present invention. To calibrate the position of the controller within the space, the user 102 may be prompted via on-screen instructions, audible instruction or a combination thereof, to hold the controller 104 in a first position. This enables the mobile depth camera 105 to capture image and depth data for objects within the field of view 105a. In this embodiment, the monitor 108 and the fixed depth camera 110 are both within the field of view 105a of the mobile depth camera 105. After being prompted to move into a second position, the controller 104' along with the mobile depth camera 105' can capture additional image and depth data within a second field of view 105a'.

FIG. 3B illustrates other possible steps in calibrating the mobile depth camera 105, in accordance with one embodiment of the present invention. In this embodiment, the user 102 stands in front of the monitor 108, fixed depth camera 110 and shelf units 112a/b. In order to capture image and depth data from a variety of angles, the user 102 may be prompted to assume positions of user 102' and/or user 102". In the various positions, the mobile depth camera 105 can capture image and depth data of the shelf units 112a/b, monitor 108 and fixed depth camera 110 within their respective field of views. In other embodiments, calibration may require raising, lowering, tilting or yawing the controller 104 while in the various positions of the users 102, 102' and 102".

Figure 4A:
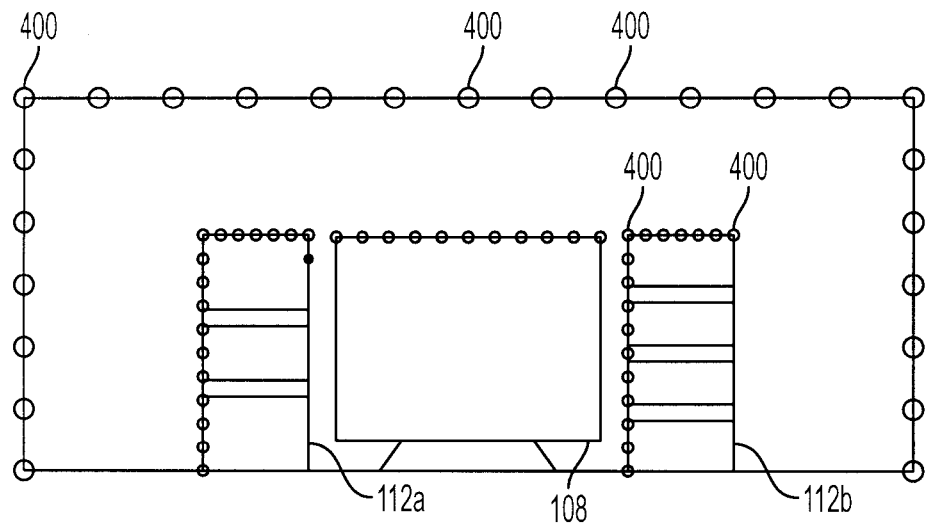
FIG. 4A illustrates analyzed image and depth data from the mobile depth camera, in accordance with one embodiment of the present invention.

FIG. 4A illustrates analyzed image and depth data from the mobile depth camera 105, in accordance with one embodiment of the present invention. Fixed points 400 can be determined based on the image and depth data captured during the calibration of the depth camera 105. In some embodiments, the console can execute software that analyzes the image and depth data to create wireframe models of stationary objects within the field of view of the controller and integrated mobile depth camera. When the mobile depth camera is used to determine motion of the controller, real-time images from the mobile depth camera can be compared to data generated using the wireframe models. In such embodiments, different ratios of wireframe elements captured from the image and depth data can be used to determine the position of the controller. In other embodiments, the console can analyze the image and depth data to link fixed points and generate a smaller set of recognized fixed points.

Figure 4B:
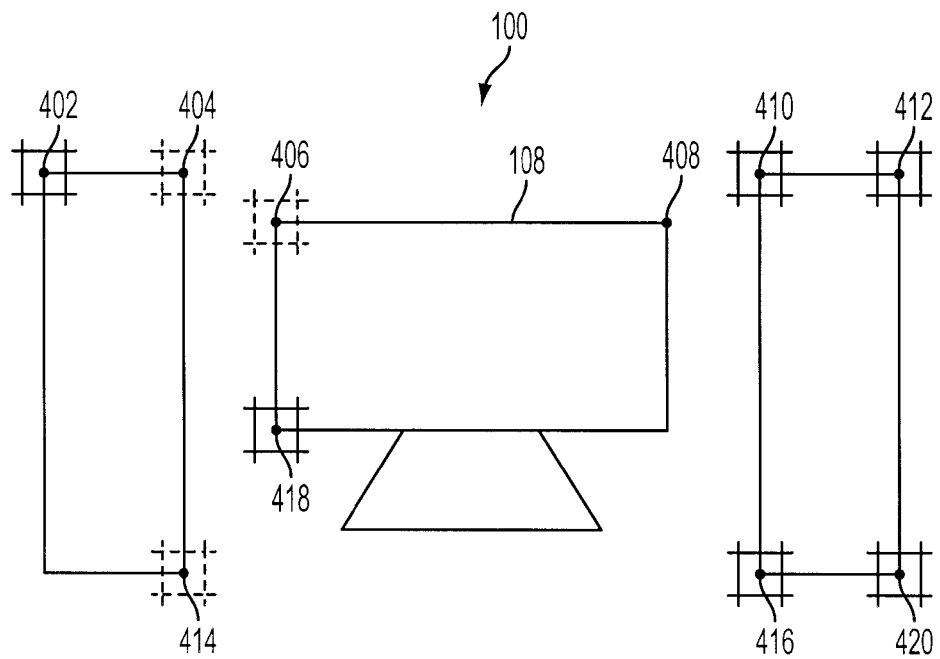
FIG. 4B illustrates recognized fixed points within a space in accordance with one embodiment of the present invention.

FIG. 4B illustrates recognized fixed points within a space 100 in accordance with one embodiment of the present invention. When calibrating the controller image and depth data can be analyzed to determine recognized fixed points within the field of view of the mobile depth camera. In one embodiment, the recognized fixed points are selected from a larger set of fixed points similar to those identified in FIG. 4A. The console can execute software to analyze image and depth data for a large set of fixed points captured from a variety of angles and positions within the space. Analysis of the large set of fixed points can filter the large set of fixed points to a smaller set of recognized fixed points based on predefined criteria.

In one embodiment, selection of recognized fixed points from the large set of fixed points can be made based on relative depth contrast between a fixed point and surrounding points. For example, in the scene 100, recognized fixed points 402, 404, 410, and 412 can be selected because of the prominence of the corners of the shelves 112a and 112b. Depth data for the recognized fixed points 404-404 and 410-412 can be more readily resolved and recognized based on the prominence of the corners of the shelves compared to other objects within the scene 100. Similarly, depth data for the recognized fixed points 406 and 408 can resolved based on the relative position of the monitor 108.

Image data can also be used in conjunction with depth data to determine recognized fixed points. Color contrast along with relative pixel locations can be used to supplement depth data in determining which fixed points can be used as recognized fixed points. In some embodiments, depth data can be used more extensively when determining recognized fixed points because of variation in lighting conditions within the space 100.

Figure 5A:
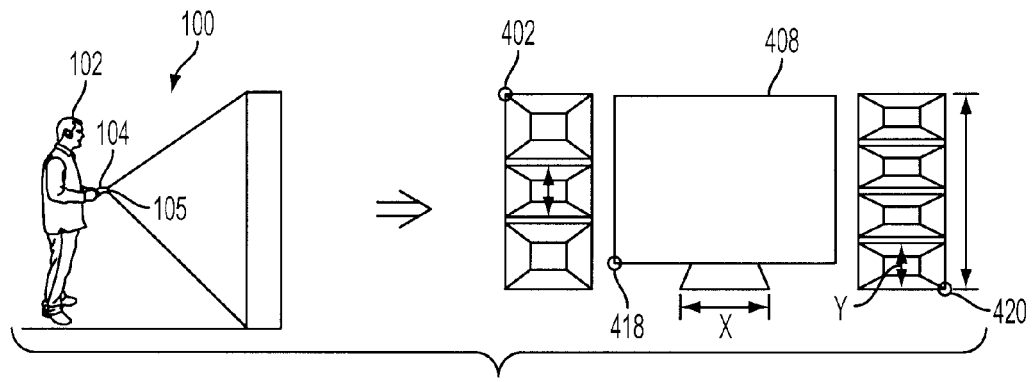
FIGS. 5A and 5B illustrate recognized fixed points within a scene from the perspective of the mobile depth camera, in accordance with one embodiment of the present invention.
Figure 5B:
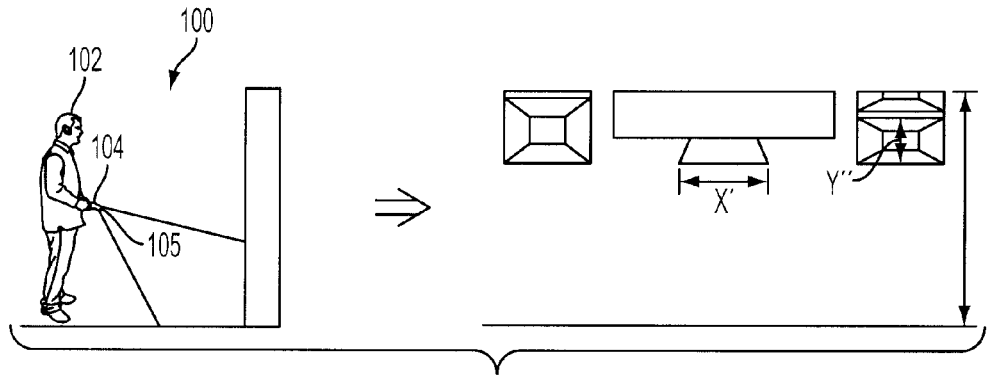

FIGS. 5A and 5B illustrate recognized fixed points within a scene from the perspective of the mobile depth camera, in accordance with one embodiment of the present invention. The left half of FIG. 5A illustrates a side-view of a scene 100 with a user 102 holding a controller 104 with a mobile depth camera 105. The right half of FIG. 5A illustrates an image captured of the scene 100 using the mobile depth sensing camera 105 in accordance with one embodiment of the present invention.

In FIG. 5A, the user 102 holds the controller 104 so the field of view of the mobile depth camera is substantially straightforward. This provides the mobile depth camera 105 with a field of view that results in the image shown in the right half of FIG. 5A. As illustrated the depth data is not conveyed but recognized fixed points 402, 408, 418 and 420 have been identified.

In the left side of FIG. 5B, the user 102 has pitched the controller forward so the field of view of the mobile depth camera is slightly down. This results in the image seen in the right side of FIG. 5B where only recognized fixed points 418 and 420 remain within the field of view of the mobile depth camera. By comparing the image and depth data from FIGS. 5A and 5B, software executed by the console can determine that the user pitched the controller 104 forward. In one embodiment, the loss of recognized fixed points 402 and 408 within FIG. 5B can indicate a change in position of the controller 104. In other embodiments, image data can be used to determine relative changes in distance. For example, relative changes be determined based on changes from distance X in FIG. 5A to distance X' in FIG. 5B. Similarly, relative changes in distance Y in FIG. 5A to distance Y' in FIG. 5B can be used to determine relative movement of the controller 104.

Figure 6A:
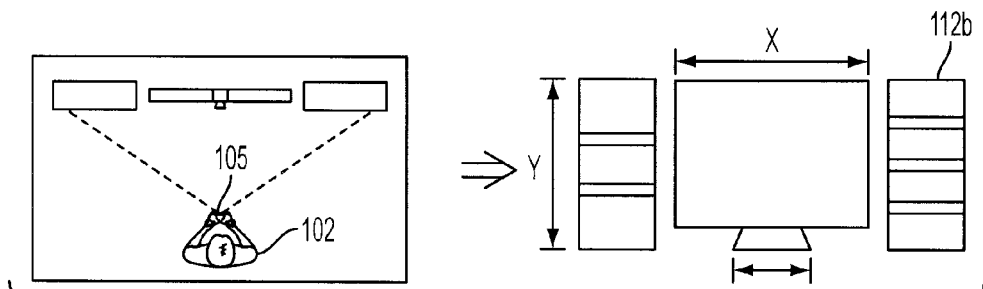
FIGS. 6A and 6B illustrate recognized fixed points within a scene from the perspective of the mobile depth camera, in accordance with one embodiment of the present invention.
Figure 6B:
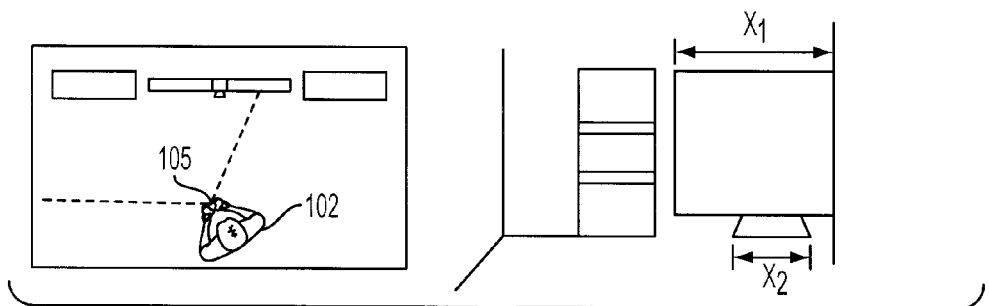

FIGS. 6A and 6B illustrate recognized fixed points within a scene from the perspective of the mobile depth camera, in accordance with one embodiment of the present invention. The left side of FIG. 6A and FIG. 6B illustrates a top view of a user 102 within a space 100 holding a controller 104 with a mobile depth camera 105. The right side of FIG. 6A and FIG. 6B show the view of the space 100 as captured by the mobile depth camera 105. In FIG. 6A, the user 102 is shown facing the forward toward the monitor 108. The image captured appears relatively straight and level indicating that the mobile depth camera and hence the controller are being held in a relatively level position, i.e. relatively no yaw, pitch nor roll. As illustrated in FIG. 6B, the user 102 has turned to the left resulting in the controller yawing to the left relative to the image in FIG. 6A. This results in mobile depth camera 105 capturing the image seen on the right side of FIG. 6B.

As the mobile depth camera 105 is yawed to the left relative to the position in FIG. 6A, the objects within the field of view change. Whereas the recognized points for the shelves 112b were visible in FIG. 6A, the same recognized points are not visible in FIG. 6B. Based on the recognized points within the mobile depth camera field of view, the location and orientation of the controller can be determined based on image and depth data captured during the calibration of the controller.

Figure 6C:
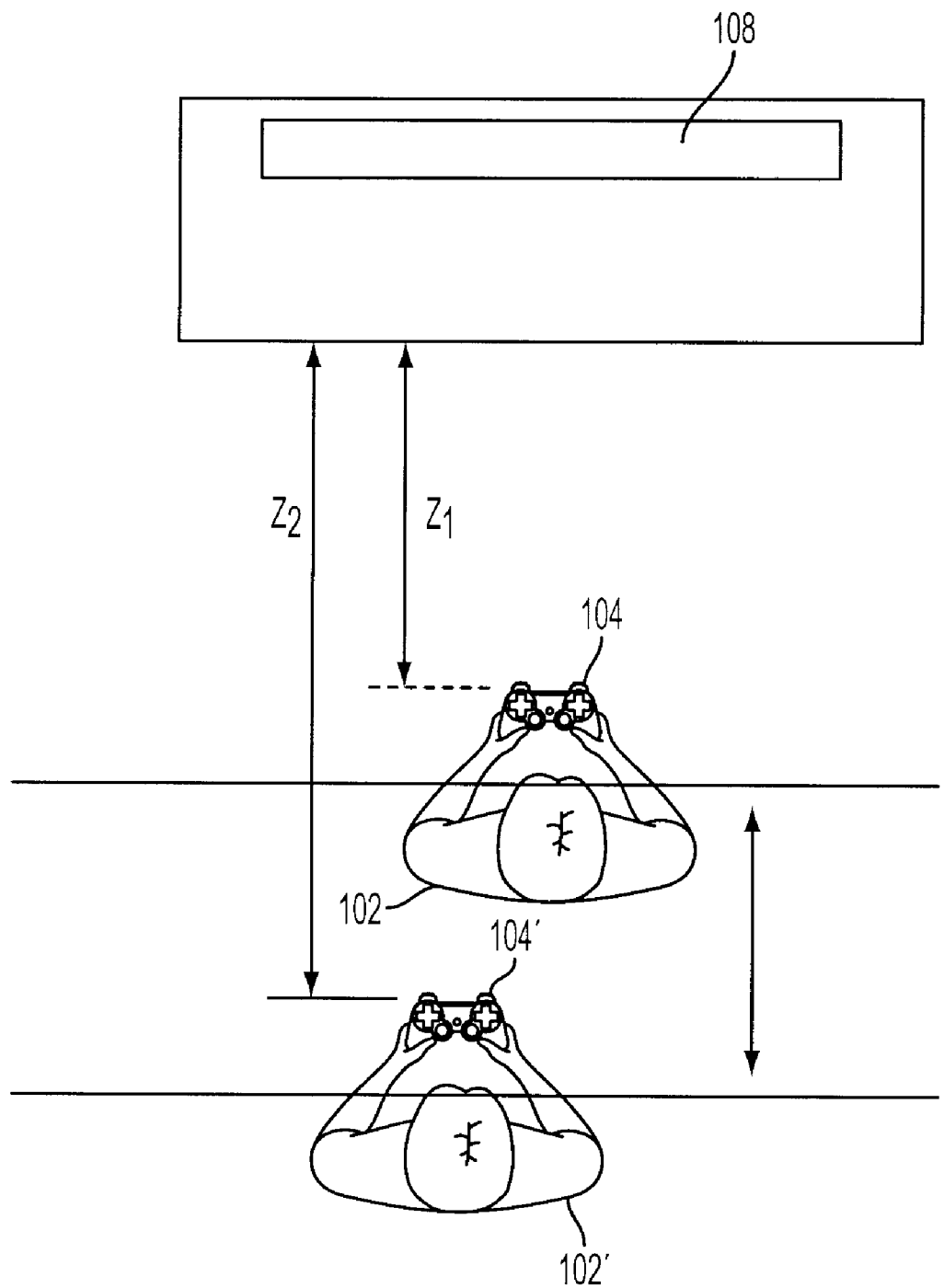
FIG. 6C illustrates a top view of a scene where depth data from the mobile depth camera is used to determine the position of the controller within the space in accordance with one embodiment of the present invention.

FIG. 6C illustrates a top view of a scene where depth data from the mobile depth camera is used to determine the position of the controller within the space in accordance with one embodiment of the present invention. In one embodiment, depth data captured by the mobile depth camera can be used in conjunction with the image data to determine the position of the controller in the space. As shown in FIG. 6C, the mobile depth camera can determine that the controller 104 is being held by user 102 at a distance Z1 from the monitor 108. Should the user 102 move to the position of user 102', depth data captured by the mobile depth camera can measure the distance Z2 from the controller 104' to the monitor 108.

Though the entire user 102 is shown moving to distance Z2, in mobile depth camera may be able to determine changes in distance based on the user 102 moving the controller forwards and backwards with their arms. For example, the mobile depth camera can determine a distance Z1 to the monitor 108 when a user 102 holds the controller close to their body. Similarly, the mobile depth camera can determine changes in distance to the monitor 108 as the user extends their arms toward the monitor 108.

In some embodiments, the changes in distance from Z1 to Z2 can be used to interact with the session displayed on the monitor 108. For example, depth data and image data can be processed to determine corresponding movements in a three-dimensional virtual world. In one embodiment, depth data captured while the controller is moving toward the monitor can result in forward motion being displayed on the monitor 108. Similarly, depth data captured while the controller is moving away from the monitor can result backward motion being displayed on the monitor.

Figure 7:
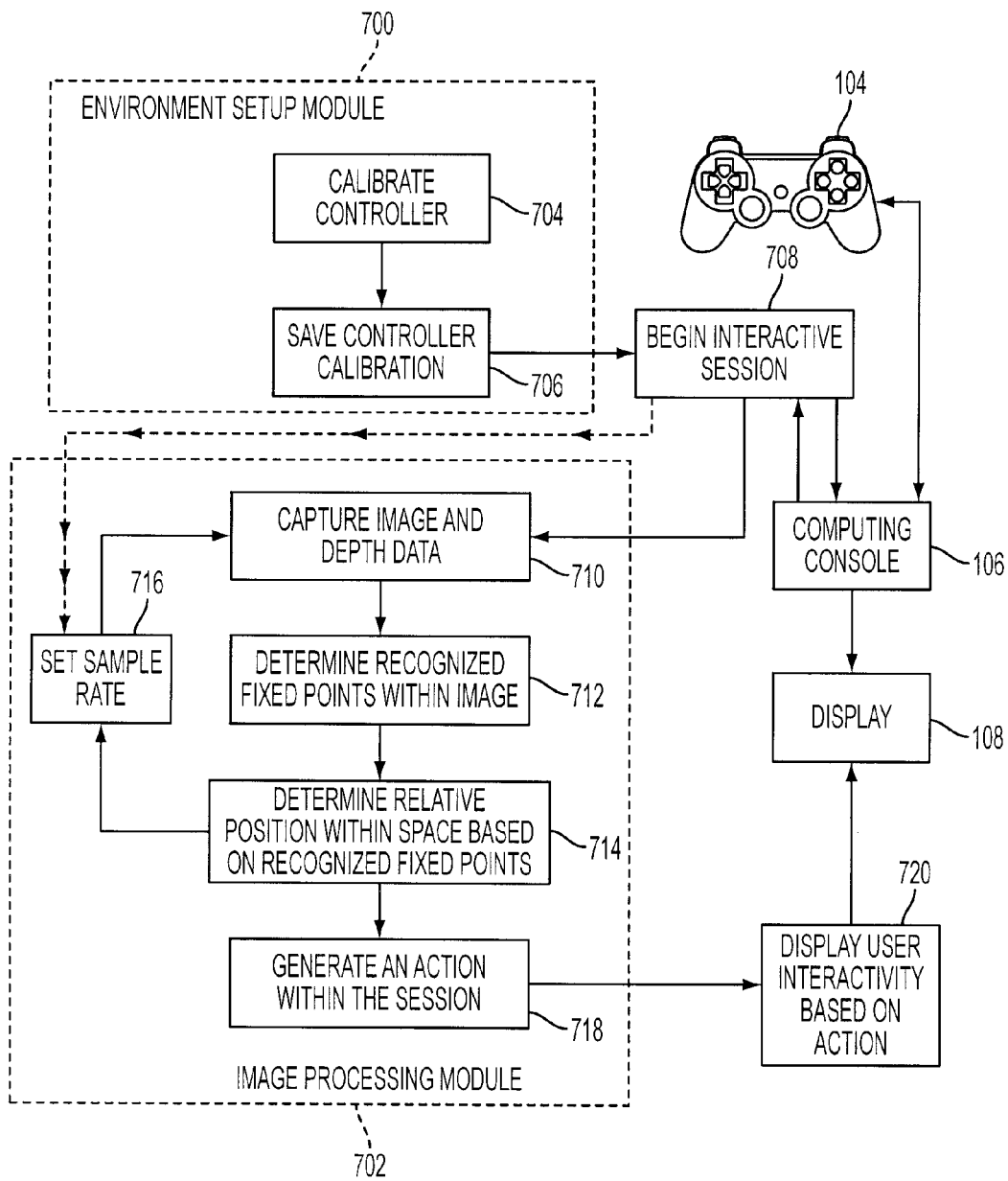
FIG. 7 is an exemplary flow chart illustrating operations to use the mobile depth camera to determine the position of the controller within the space, in accordance with one embodiment of the present invention.

FIG. 7 is an exemplary flow chart illustrating operations to use the mobile depth camera to determine the position of the controller within the space, in accordance with one embodiment of the present invention. An environment setup module 700 can perform operation 704 that calibrates the controller and operation 706 that saves the controller calibration to a memory. With the controller calibrated, operation 708 begins an interactive session. In one embodiment, interactive sessions are executed by the computing console and can be, but are not limited to interactive games and graphical user interfaces for software such as operating systems, Internet web browsers, and digital photo viewing interfaces. Since the controller calibrations can be saved to a memory some embodiments do not require the execution of operations within the environment setup module 700. In such embodiments, the saved controller calibrations can be recalled from the memory before, after or simultaneously when the interactive session is begun.

In other embodiments, the environment setup module 700 can be utilized after an interactive session has been started. These embodiments can allow the controller to be customized for the particular nuances of a particular interactive session. For example, in a photo viewing interactive session moving the controller toward the monitor can allow the user to zoom in on an image show on the display. Likewise, a variety of interactive gaming sessions may allow a user to calibrate the controller based on the type of game. Depth data captured by the mobile depth camera can be utilized to control one aspect of a driving simulation while changes in depth data can be used for something different in a First-Person-Shooter (FPS) and the same changes in depth data can be used to control something entirely different in a Massive Multiplayer Online Role Playing Game (MMORPG).

When an interactive session has a customized controller calibration the environment setup module may prompt the user to calibrate the controller and save the controller calibration to a memory. Subsequently, upon starting the interactive session the saved controller calibration can be automatically loaded. In embodiments where multiple users can store multiple calibrations, a default calibration may be loaded and the user can choose to load their saved calibration from a menu displaying the multiple users.

When an interactive session is running, operation within the image processing module 702 can allow users to interact with the interactive session. When the interactive session begins, a sample rate for the mobile depth camera can be set in operation 716. The sample rate can vary based on accuracy and precision required by the interactive session. In embodiments such as navigating an Internet web browser or utilizing a graphical user interface for an operating system, the sample rate may be lower than that of a FPS. In other embodiments, the sample rate can be continuously modified during an interactive session.

For example, the sample rate of the mobile depth camera can be increased when higher accuracy and precision are required and subsequently lowered when accuracy and precision are no longer required. One of many examples where this may be utilized is in a FPS when a user is using a sniper rifle. In order to more realistically simulate the difficulty of using a sniper rifle, the sample rate of the mobile depth sensing camera can be increased to capture minute movements of the user's hand to simulate movement of the virtual sniper rifle. When the user is no longer using the sniper rifle, the sample rate can seamlessly be reduced to decrease image processing requirements for the mobile depth sensing camera. In some embodiments, processors within the controller 104 perform the image and depth data processing. In other embodiments, image and depth data from the mobile depth camera is sampled at the designated sample rate and sent to the computing console 106 for processing. In either embodiment, compression techniques may be used to reduce the bandwidth required to send either processed data or raw data to the console 106 for additional processing.

Operation 710 captures a first frame of image and depth data using the mobile depth camera. In operation 712, the captured image and depth data is analyzed to determine recognized fixed points within the image. Operation 714 determines the relative position within the space based on the recognized fixed points. Operation 716 uses the set sample rate to determine when to capture a second frame of image and depth data using operation 710. Operation 718 generates an action within the interactive session by determining difference between the first and second frame of image and depth data.

In one embodiment, the motions determined by the image processing module 702 can supplement additional user input to the controller 104. For example, accelerometer data can be used in addition to image and depth data to determine yaw, pitch and roll of the controller 104. Additionally, joysticks, buttons and triggers on the controller 104 can be used to provide additional user input. The combination of the various forms of user input to the controller can be used so operation 720 displays user interactivity based on input to the controller 104 on the display 108.

Figure 8:
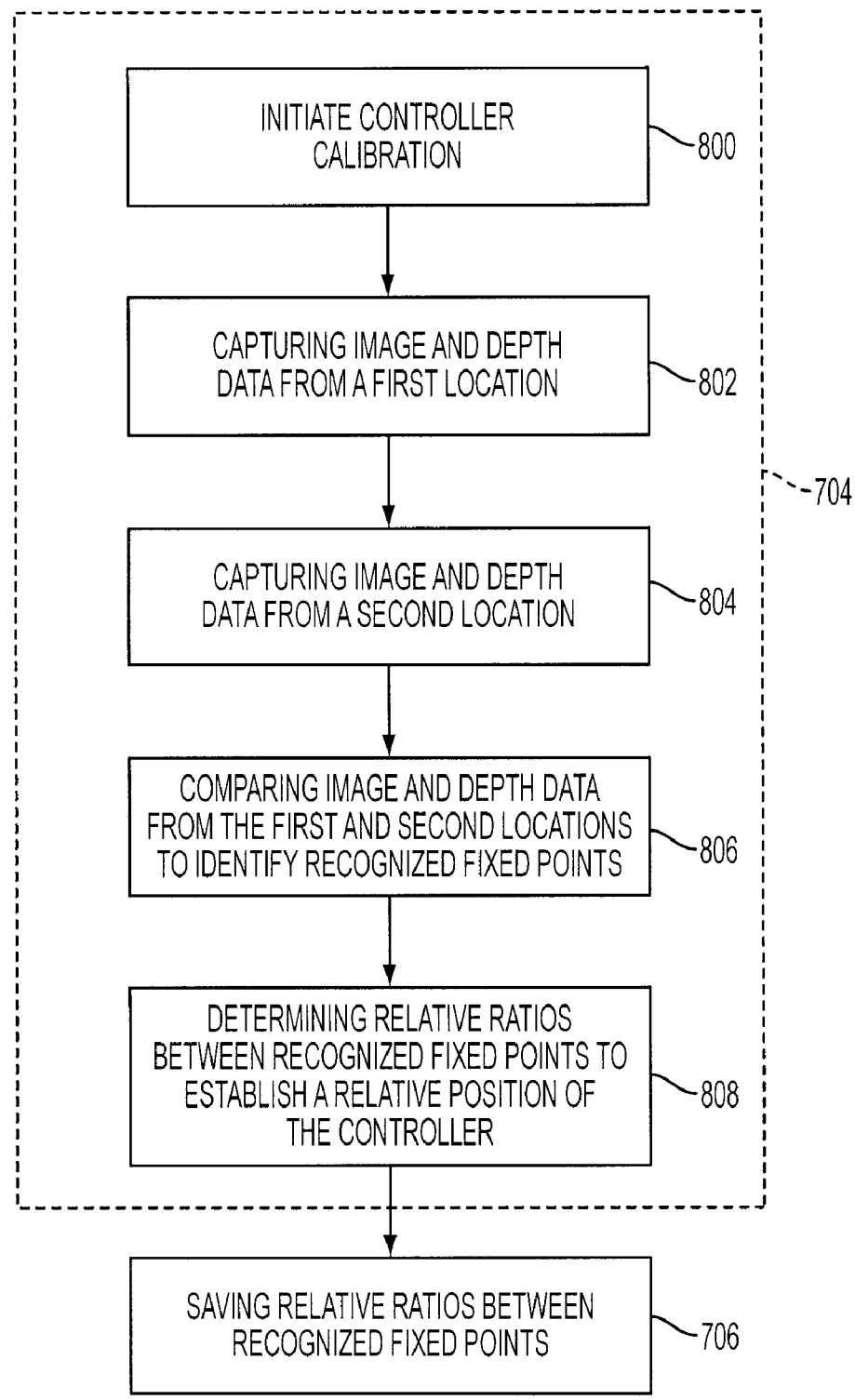
FIG. 8 is an exemplary flow chart that illustrates operations to calibrate the mobile depth camera in order to determine the position of the controller within the space, in accordance with one embodiment of the present invention.

FIG. 8 is an exemplary flow chart that illustrates operations to calibrate the mobile depth camera in order to determine the position of the controller within the space, in accordance with one embodiment of the present invention. Operation 800 initiates controller calibration. As previously discussed, controller calibration can be performed prior to or after an interactive session has been initiated. Operation 802 captures image and depth data from a first location. In order to simplify calibration, the user may be prompted with onscreen diagrams to stand in approximate locations within the space. The onscreen diagram can instruct the user to stand in a second location where operation 804 captures image and depth data from a second location. In other embodiments, the user may be prompted to hold the controller in a variety of orientations such as changing the yaw, pitch and roll of the controller. In still further embodiments, the user may be prompted to hold the controller at various elevations above the floor of the space.

Operation 806 compares the image and depth data captured in the first and second location to identify recognized fixed points. In operation 808, the recognized fixed points can be used to create a wireframe model of the space to determine relative ratios between recognized fixed points. The relative rations between recognized fixed points could then be used to determine the relative position of the controller within the space. Operation 706 is used to save the controller calibration to a memory.

Figure 9:
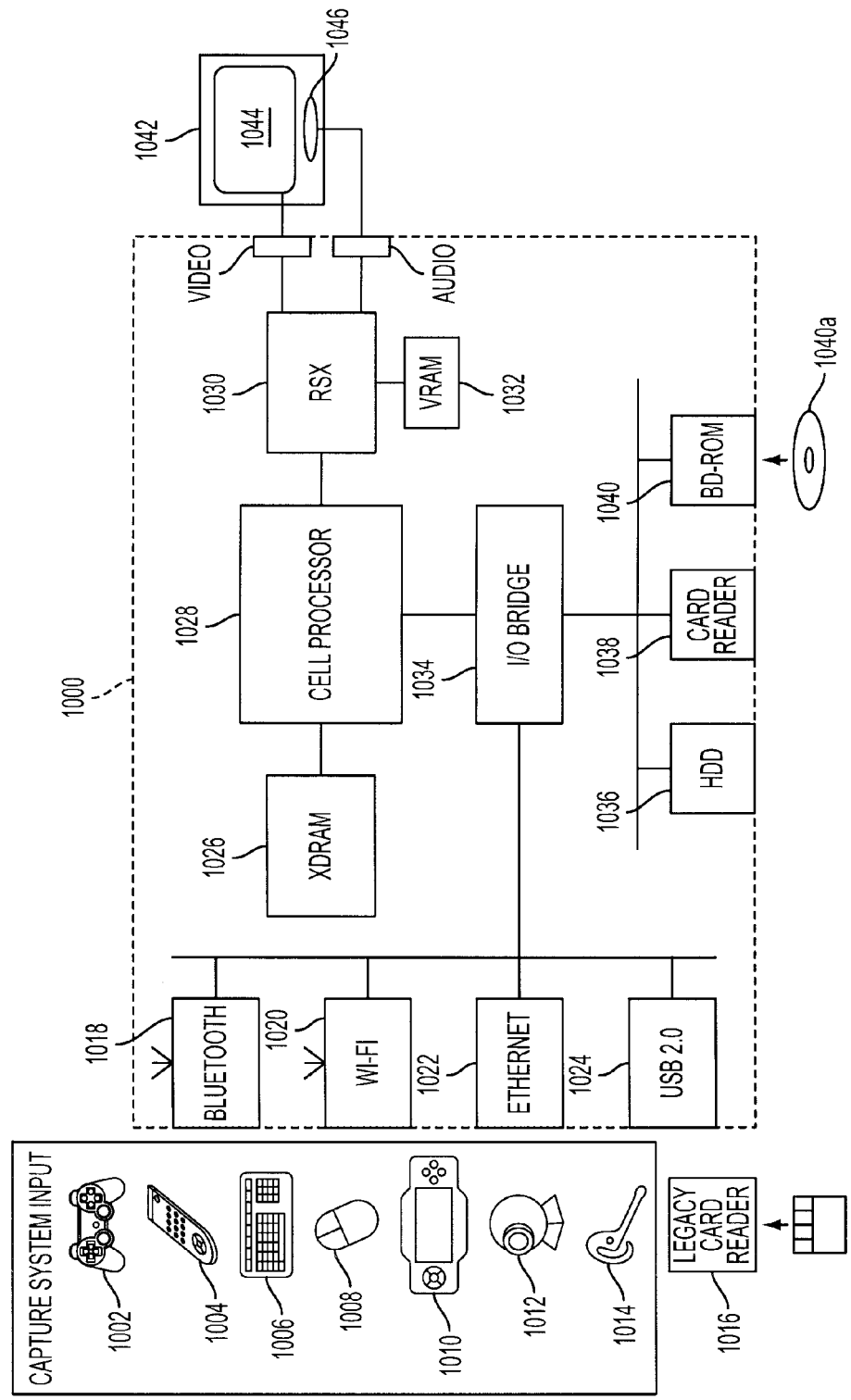
FIG. 9 schematically illustrates the overall system architecture of the Sony® Playstation 3® entertainment device, a computer system capable of utilizing dynamic three-dimensional object mapping to create user-defined controllers in accordance with one embodiment of the present invention.

FIG. 9 schematically illustrates the overall system architecture of the Sony® Playstation 3® entertainment device, a computer system capable of utilizing dynamic three-dimensional object mapping to create user-defined controllers in accordance with one embodiment of the present invention. A system unit 1000 is provided, with various peripheral devices connectable to the system unit 1000. The system unit 1000 comprises: a Cell processor 1028; a Rambus® dynamic random access memory (XDRAM) unit 1026; a Reality Synthesizer graphics unit 1030 with a dedicated video random access memory (VRAM) unit 1032; and an I/O bridge 1034. The system unit 1000 also comprises a Blu Ray® Disk BD-ROM® optical disk reader 1040 for reading from a disk 1040a and a removable slot-in hard disk drive (HDD) 1036, accessible through the I/O bridge 1034. Optionally the system unit 1000 also comprises a memory card reader 1038 for reading compact flash memory cards, Memory Stick® memory cards and the like, which is similarly accessible through the I/O bridge 1034.

The I/O bridge 1034 also connects to six Universal Serial Bus (USB) 2.0 ports 1024; a gigabit Ethernet port 1022; an IEEE 802.11b/g wireless network (Wi-Fi) port 1020; and a Bluetooth® wireless link port 1018 capable of supporting of up to seven Bluetooth connections.

In operation the I/O bridge 1034 handles all wireless, USB and Ethernet data, including data from one or more game controllers 1002. For example when a user is playing a game, the I/O bridge 1034 receives data from the game controller 1002 via a Bluetooth link and directs it to the Cell processor 1028, which updates the current state of the game accordingly.

The wireless, USB and Ethernet ports also provide connectivity for other peripheral devices in addition to game controllers 1002, such as: a remote control 1004; a keyboard 1006; a mouse 1008; a portable entertainment device 1010 such as a Sony Playstation Portable® entertainment device; a video camera such as an EyeToy® video camera 1012; and a microphone headset 1014. Such peripheral devices may therefore in principle be connected to the system unit 1000 wirelessly; for example the portable entertainment device 1010 may communicate via a Wi-Fi ad-hoc connection, whilst the microphone headset 1014 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1016 may be connected to the system unit via a USB port 1024, enabling the reading of memory cards 1048 of the kind used by the Playstation® or Playstation 2® devices.

In the present embodiment, the game controller 1002 is operable to communicate wirelessly with the system unit 1000 via the Bluetooth link. However, the game controller 1002 can instead be connected to a USB port, thereby also providing power by which to charge the battery of the game controller 1002. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1004 is also operable to communicate wirelessly with the system unit 1000 via a Bluetooth link. The remote control 1004 comprises controls suitable for the operation of the Blu Ray Disk BD-ROM reader 1040 and for the navigation of disk content.

The Blu Ray Disk BD-ROM reader 1040 is operable to read CD-ROMs compatible with the Playstation and PlayStation 2 devices, in addition to conventional pre-recorded and recordable CDs, and so-called Super Audio CDs. The reader 1040 is also operable to read DVD-ROMs compatible with the Playstation 2 and PlayStation 3 devices, in addition to conventional pre-recorded and recordable DVDs. The reader 1040 is further operable to read BD-ROMs compatible with the Playstation 3 device, as well as conventional pre-recorded and recordable Blu-Ray Disks.

The system unit 1000 is operable to supply audio and video, either generated or decoded by the Playstation 3 device via the Reality Synthesizer graphics unit 1030, through audio and video connectors to a display and sound output device 1042 such as a monitor or television set having a display 1044 and one or more loudspeakers 1046. The audio connectors 1050 may include conventional analogue and digital outputs whilst the video connectors 1052 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1028. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1012 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1000. The camera LED indicator is arranged to illuminate in response to appropriate control data from the system unit 1000, for example to signify adverse lighting conditions. Embodiments of the video camera 1012 may variously connect to the system unit 1000 via a USB, Bluetooth or Wi-Fi communication port. Embodiments of the video camera may include one or more associated microphones that are also capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 1000, an appropriate piece of software such as a device driver should be provided. Device driver technology is well-known and will not be described in detail here, except to say that the skilled man will be aware that a device driver or similar software interface may be required in the present embodiment described.

Embodiments may include capturing depth data to better identify the real-world user and to direct activity of an avatar or scene. The object can be something the person is holding or can also be the person's hand. In this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Recent advances in three-dimensional imagery have opened the door for increased possibilities in real-time interactive computer animation. In particular, new "depth cameras" provide the ability to capture and map the third-dimension in addition to normal two-dimensional video imagery. With the new depth data, embodiments of the present invention allow the placement of computer-generated objects in various positions within a video scene in real-time, including behind other objects.

Moreover, embodiments of the present invention provide real-time interactive gaming experiences for users. For example, users can interact with various computer-generated objects in real-time. Furthermore, video scenes can be altered in real-time to enhance the user's game experience. For example, computer generated costumes can be inserted over the user's clothing, and computer generated light sources can be utilized to project virtual shadows within a video scene. Hence, using the embodiments of the present invention and a depth camera, users can experience an interactive game environment within their own living room. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above-described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data that can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A handheld controller for a computer system, comprising;
    a controller housing, the controller housing defined by an exterior that encloses an interior volume;
    interface controls, the interface controls partially exposed to the exterior of the housing;
    a depth camera assembly, the depth camera assembly including a depth module, an image module and processing logic, the depth module and image module defined to receive image and depth data through a camera lens; and
    a communication module, the communication module configured to transmit and receive data from the processing logic of the depth camera assembly to the computer system, wherein changes to the image and depth data received by the depth camera assembly trigger input commands for the computer system;
    wherein the depth camera assembly is contained within the controller housing and the camera lens is exposed to the exterior of the controller housing.

2. An interactive computing system configured to display an interactive session on a display, comprising;
    a computing console, the computing console including;
        a central processing unit;
        a graphics processing unit; and
        a communications interface, the communications interface being configured to provide communication to and from the computing console; and
    a controller for the computing system, the controller including;
        a depth camera, the depth camera having a depth module, an image module and processing logic; and
        a communication module, the communication module being configured to receive and transmit data from the processing logic of the depth camera to the communications interface of the computing console,
    wherein changes in image and depth data captured by the depth camera are translated to input commands for the computing system;
    wherein the depth module is defined to capture depth data and the image module is defined to capture image data for objects within a field of view of the depth camera.

3. The computer system of claim 2, wherein the processing logic is defined to process the captured depth data and image data.

4. The computer system of claim 2, wherein the communications module is defined to transmit and receive data from the depth camera to the computing console.

* * * * *